US011052734B2

(12) United States Patent
Horita et al.

(10) Patent No.: US 11,052,734 B2
(45) Date of Patent: Jul. 6, 2021

(54) VEHICLE DOOR STRUCTURE

(71) Applicant: MAZDA MOTOR CORPORATION, Hiroshima (JP)

(72) Inventors: Yoshihiko Horita, Higashihiroshima (JP); Daisuke Nakazato, Hiroshima (JP); Junya Yokogawa, Hiroshima (JP); Tomoki Takahashi, Hiroshima (JP); Ishii Shoki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 126 days.

(21) Appl. No.: 16/446,153

(22) Filed: Jun. 19, 2019

(65) Prior Publication Data

US 2019/0389285 A1 Dec. 26, 2019

(30) Foreign Application Priority Data

Jun. 25, 2018 (JP) ............................ JP2018-119695

(51) Int. Cl.
*B60J 5/04* (2006.01)
*B62D 25/02* (2006.01)

(52) U.S. Cl.
CPC ........... *B60J 5/0479* (2013.01); *B60J 5/0412* (2013.01); *B60J 5/0427* (2013.01); *B60J 5/0429* (2013.01); *B60J 5/0444* (2013.01); *B60J 5/0455* (2013.01); *B60J 5/0461* (2013.01); *B62D 25/025* (2013.01)

(58) Field of Classification Search
CPC ....... B60J 5/0427; B60J 5/0461; B60J 5/0479
USPC ............................................... 296/150, 146.6
See application file for complete search history.

(56) References Cited

U.S. PATENT DOCUMENTS

2003/0006625 A1* 1/2003 Moriyama ............. B60J 5/0412 296/146.6
2004/0174040 A1 9/2004 Mikolai et al.
2010/0156140 A1* 6/2010 Elliott .................... B60J 5/0479 296/146.5
2010/0244492 A1* 9/2010 Itakura .................. B62D 25/04 296/193.06

(Continued)

FOREIGN PATENT DOCUMENTS

EP 1 275 539 A1 1/2003
EP 1 418 076 A1 5/2004

OTHER PUBLICATIONS

The extended European search report issued by the European Patent Office dated Nov. 22, 2019, which corresponds to European Patent Application No. 19180526.6-1015 and is related to U.S. Appl. No. 16/446,153.

*Primary Examiner* — Jason S Morrow
(74) *Attorney, Agent, or Firm* — Studebaker & Brackett PC

(57) ABSTRACT

A vehicle door structure that can displace inward a region directly above a lower end of a door built-in center pillar while preventing displacement of a door lower surface to absorb lateral collision energy immediately after lateral collision is provided. In the vehicle door structure including a door built-in center pillar extending from an upper end to a lower end at a front end in a rear door of a biparting door system, a reinforcement is provided on a door lower surface below the door built-in center pillar, a part of the lower end of the door built-in center pillar is mounted to the reinforcement, and a low rigidity portion having lower rigidity than an upper part the door built-in center pillar is provided directly above the lower end of the door built-in center pillar.

6 Claims, 12 Drawing Sheets

(56) References Cited

U.S. PATENT DOCUMENTS

| | | | | |
|---|---|---|---|---|
| 2014/0077523 | A1 | 3/2014 | Choi | |
| 2019/0344830 | A1* | 11/2019 | Muraoka | B60K 1/04 |
| 2019/0390491 | A1* | 12/2019 | Yokogawa | E05B 83/38 |
| 2020/0283069 | A1* | 9/2020 | Choi | B60J 5/043 |
| 2020/0308882 | A1* | 10/2020 | Salter | B60J 10/40 |

* cited by examiner

BL
F
R
1
2
3
4
5
7
18
21
30
30FL
31
31a
33
34
35
36
37
38
44
45
50
50a
50b
50d
50e
50f
50g
50h
50i
50j
50k
53
54
58
59
60
61

VEHICLE DOOR STRUCTURE

BACKGROUND

The present application relates to a vehicle door structure including a door built-in center pillar extending from an upper end to a lower end at a front end in a rear door of a biparting door system.

DESCRIPTION OF THE RELATED ART

Generally, a biparting door system including a front door and a rear door with a biparting structure is known.

When using such a biparting door system, a vehicle body does not include a center pillar as a strength member vertically coupling a roof side rail and a side sill. Thus, for example, as disclosed in Japanese Patent Laid-Open No. 2006-096348, a configuration is known in which a rear door includes a vertical reinforcement extending from an upper end to a lower end thereof and having a hat-shaped section and the vertical reinforcement includes a pipe member extending from an upper end to a lower end thereof.

The vertical reinforcement being formed of a high rigidity member such as ultra-high tensile strength steel sheet increases rigidity of the vertical reinforcement, or door built-in center pillar, and thus the pipe member can be eliminated to reduce weight of the rear door.

Generally, in terms of a vehicle design, a vehicle door is configured so that an upper end of a door sash in an upper part of the vehicle door is inclined to be located on an inner side in a vehicle width direction relative to a lower end of a door body and that the door body has a larger thickness in the vehicle width direction than the door sash.

If the entire door including the door sash and the door body has extremely high rigidity, the door is not crushed when a lateral collision load is applied, but the door in an inclined state moves into a vehicle interior. Thus, the lateral collision load is undesirably transferred to an occupant.

Thus, when the lateral collision load is applied, it is preferable that the door body on a lower side of a belt line is crushed to absorb energy and that the door in a substantially vertical state receives the lateral collision load, thereby preventing the door from moving into the vehicle interior.

However, as described above, the vertical reinforcement or door built-in center pillar being formed of a high rigidity member such as ultra-high tensile strength steel sheet may excessively increase rigidity of the door body on the lower side of the belt line, and a heavy load may be applied to the vehicle body.

Thus, the present application has an object to provide a vehicle door structure that can displace inward a region directly above a lower end of a door built-in center pillar while preventing displacement of a door lower surface to absorb lateral collision energy immediately after lateral collision.

SUMMARY

The present application provides a vehicle door structure including a side door that is openably and closably supported by a vehicle body via a door hinge provided at a rear part of the side door, the side door including: a door side engaging portion that is provided in a lower part of the side door and engages a vehicle body side engaging portion provided in a vehicle body lower part at least at the time of lateral collision; a door built-in center pillar extending from an upper end to a lower end in a front part in the side door; and a reinforcement mounted to a door lower part below the door built-in center pillar, a part of the lower end of the door built-in center pillar being mounted to the reinforcement, a low rigidity portion having lower rigidity than an upper part of the door built-in center pillar being provided directly above the lower end of the door built-in center pillar.

According to the above described configuration, the door lower part and the vehicle body lower part engage the door built-in center pillar when a lateral collision load is applied, and the lower part of the door built-in center pillar is mounted to the reinforcement provided in the door lower part. Thus, the configuration can displace inward a region directly above the lower end of the door built-in center pillar via the low rigidity portion while preventing displacement of the door lower part to absorb lateral collision energy.

In an aspect of the present application, the door built-in center pillar includes a front surface, a rear surface, and a side surface coupling outer ends of the front and rear surfaces, and the low rigidity portion is constituted by an opening formed in the side surface.

According to the above described configuration, the opening formed in the side surface of the door built-in center pillar can reduce rigidity near the lower end of the door built-in center pillar and also reduce weight.

In an aspect of the present application, the door side engaging portion comprises a door latch that is provided via a latch mounting plate on a door lower surface inside the door built-in center pillar, the reinforcement comprises the latch mounting plate, and the opening is sized so that the door latch partially inserted through the opening can be changed in orientation when the door latch is assembled.

According to the above described configuration, the opening can be used to ensure efficient assembly of the door latch, and the latch mounting plate can be effectively used as the reinforcement. The lower part of the door built-in center pillar and the door latch that constitutes the door side engaging portion can be coupled via the latch mounting plate, thereby more efficiently preventing displacement of the door lower part.

In an aspect of the present application, a reinforcing bead extending from a position directly above the opening to an upper end of the door built-in center pillar is formed on the side surface of the door built-in center pillar.

According to the above described configuration, the reinforcing bead can be formed to increase rigidity of the door built-in center pillar, thus prevent displacement of an upper part of the door built-in center pillar along with displacement of the opening, and further prevent falling displacement of the door built-in center pillar to ensure stable crushing displacement when the door built-in center pillar is crushed.

In an aspect of the present application, the door built-in center pillar has a hat-shaped section in a plan view which opens on an inner side in a vehicle width direction, and includes flanges integrally formed with the front surface and the rear surface to extend in a front-rear direction of a vehicle, the door built-in center pillar is joined to a door inner panel via the flanges, the low rigidity portion is constituted by a non-flange portion provided at the lower end of the door built-in center pillar, and the door built-in center pillar is joined to the lower end of the door inner panel only on the side surface of the door built-in center pillar.

According to the above described configuration, the non-flange portion is provided at the lower end of the door built-in center pillar, and thus can reliably reduce rigidity near the lower end of the door built-in center pillar and also reduce weight.

In an aspect of the present application, a second side surface retracted from the side surface into a vehicle interior is formed in a front part of the lower end of the door built-in center pillar, a rear end of an impact beam provided in a front door overlaps the second side surface in a side view of the vehicle, and the non-flange portion is formed at the overlapping region.

According to the above described configuration, a load from the impact beam can be reliably received by the second side surface at the time of lateral collision, and the low rigidity portion is constituted by the non-flange portion, thereby allowing the lower end of the door built-in center pillar to be displaced inward at the time of lateral collision.

The present application can advantageously displace inward the region directly above the lower end of the door built-in center pillar while preventing displacement of the door lower surface to absorb lateral collision energy immediately after lateral collision.

DETAILED DESCRIPTION

The object of the present application to displace inward a region directly above a lower end of a door built-in center pillar while preventing displacement of a door lower surface to absorb lateral collision energy immediately after lateral collision is achieved by a vehicle door structure. The vehicle door structure includes a door built-in center pillar extending from an upper end to a lower end at a front end in a rear door of a biparting door system. A reinforcement is provided on a door lower surface below the door built-in center pillar, a part of the lower end of the door built-in center pillar is mounted to the reinforcement, and a low rigidity portion having lower rigidity than an upper part of the center pillar is provided directly above the lower end of the door built-in center pillar.

An embodiment of the present application will be described in detail with reference to the drawings.

Figure 1:
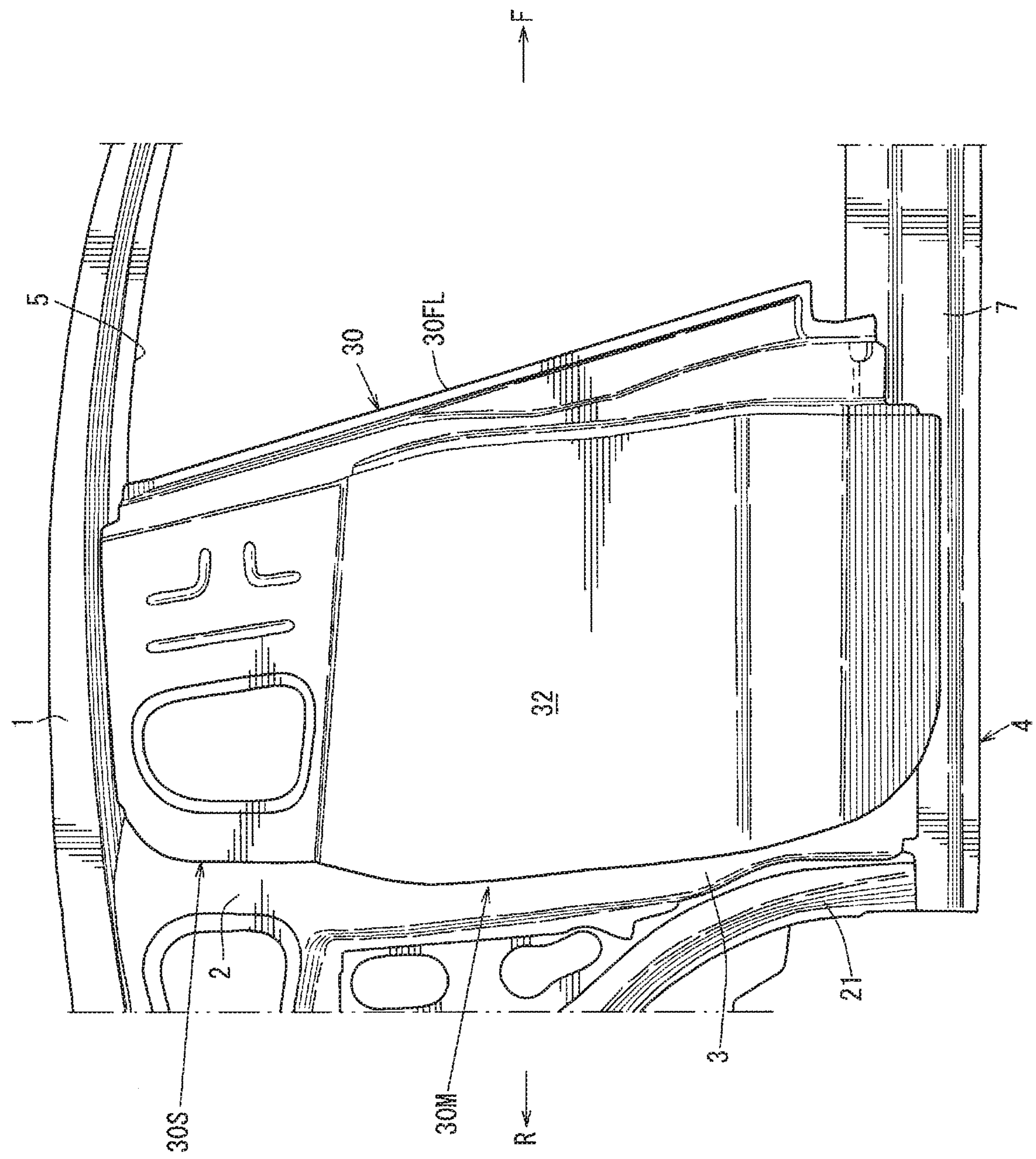
FIG. 1 is a right side view of a vehicle showing a vehicle door structure of the present application.
Figure 2:
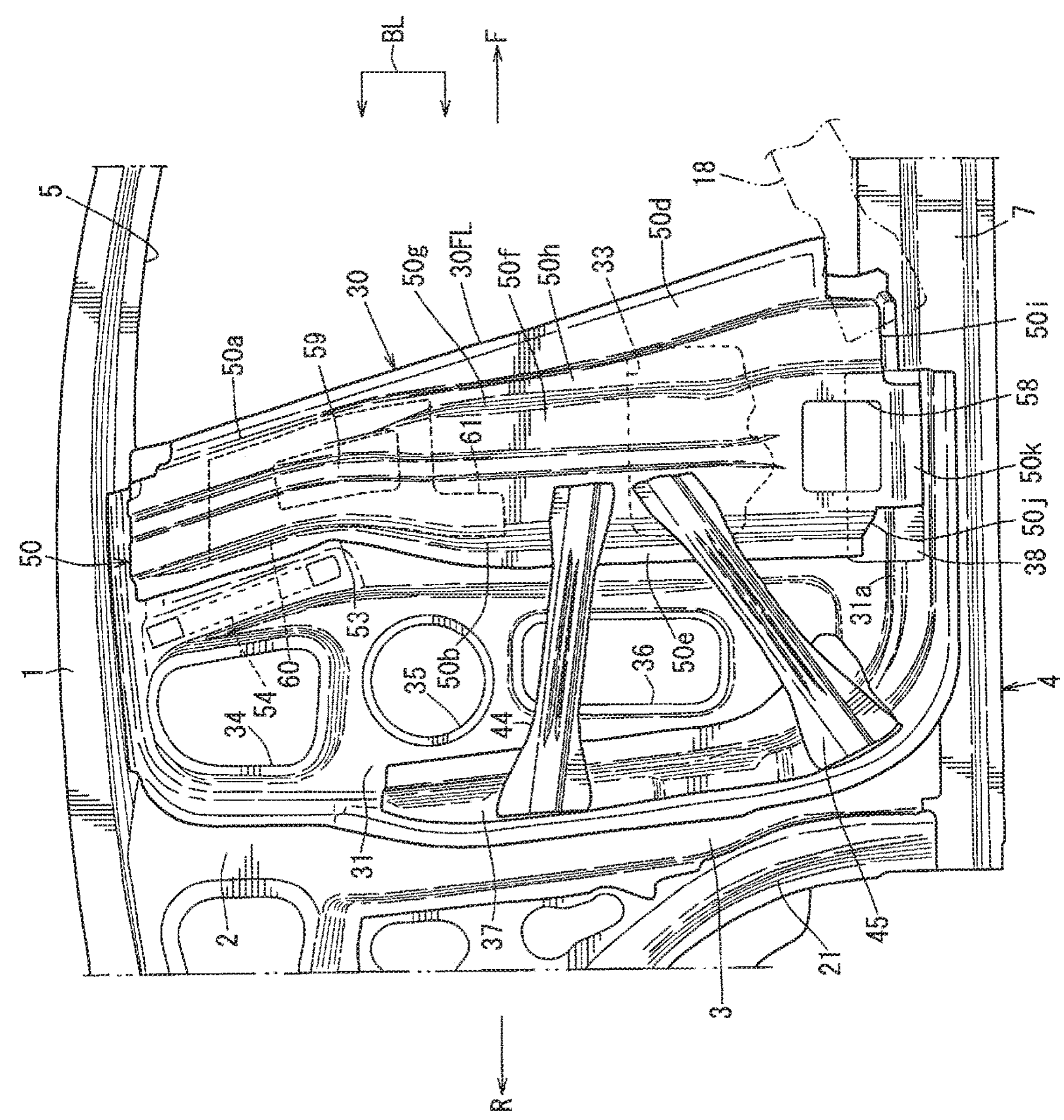
FIG. 2 is a right side view of the vehicle in FIG. 1 with a door outer panel being removed.
Figure 3:
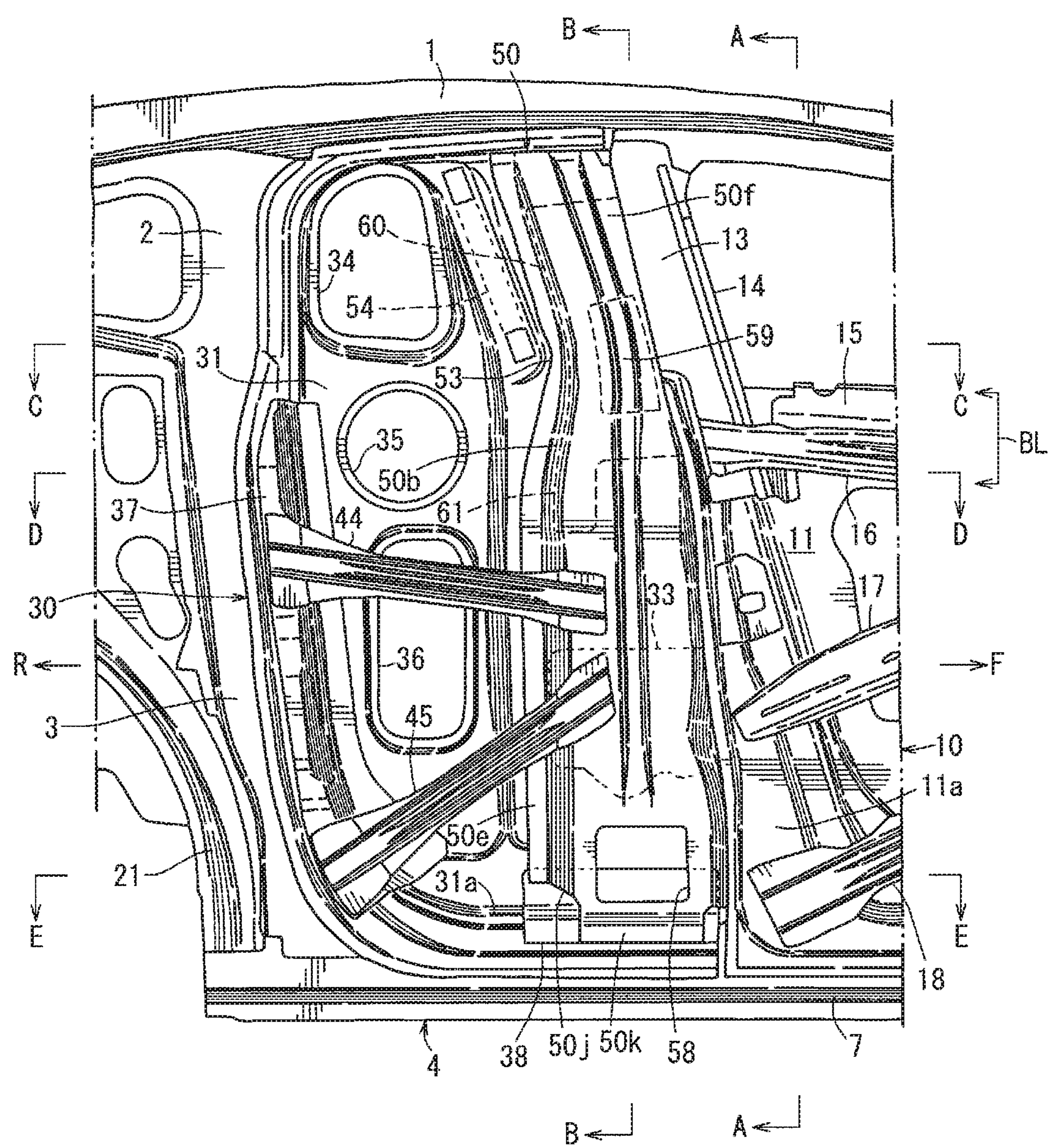
FIG. 3 is a right side view of the vehicle in FIG. 1 with a front door being mounted.
Figure 4:
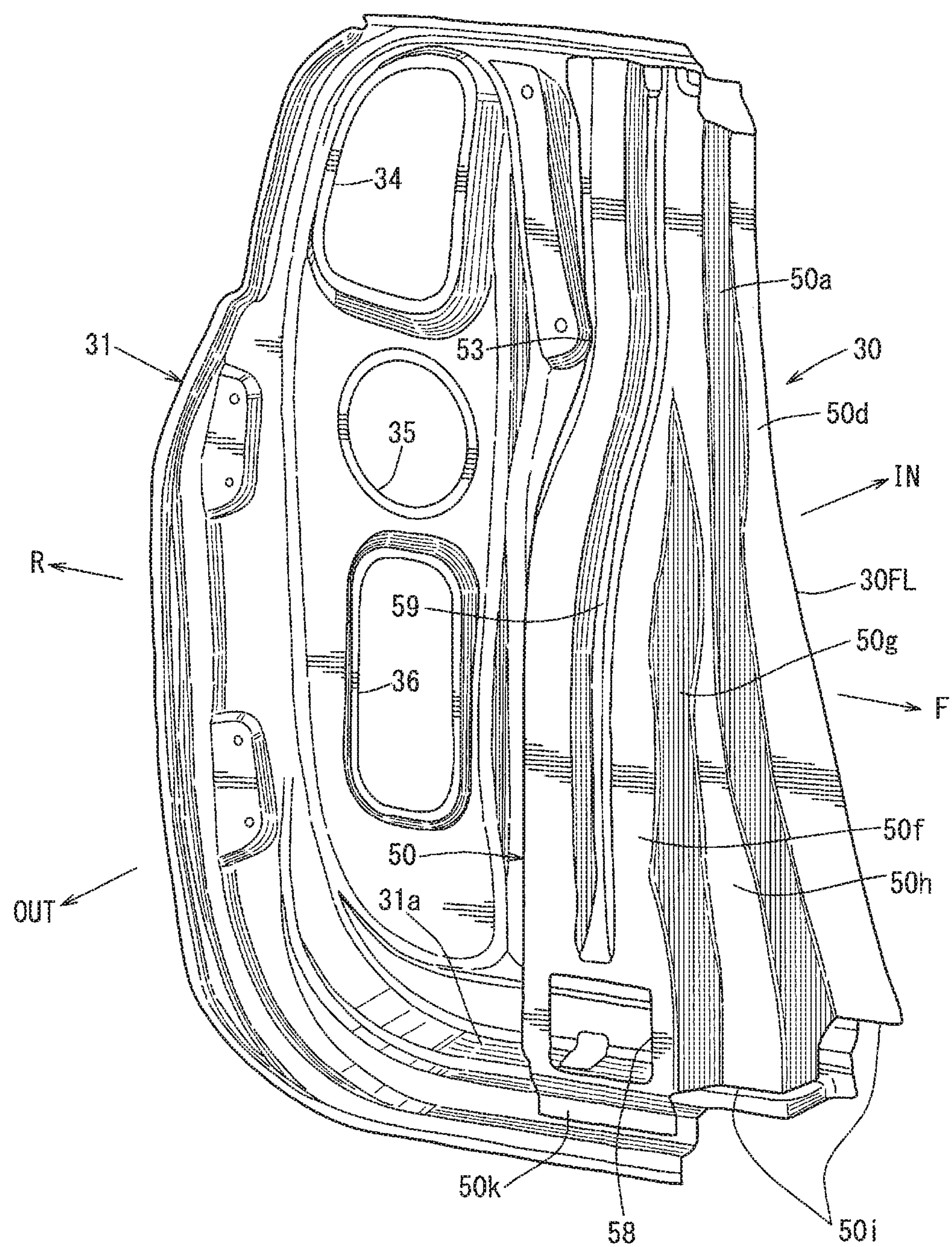
FIG. 4 is a perspective view of a rear door with the door outer panel being removed.
Figure 5:
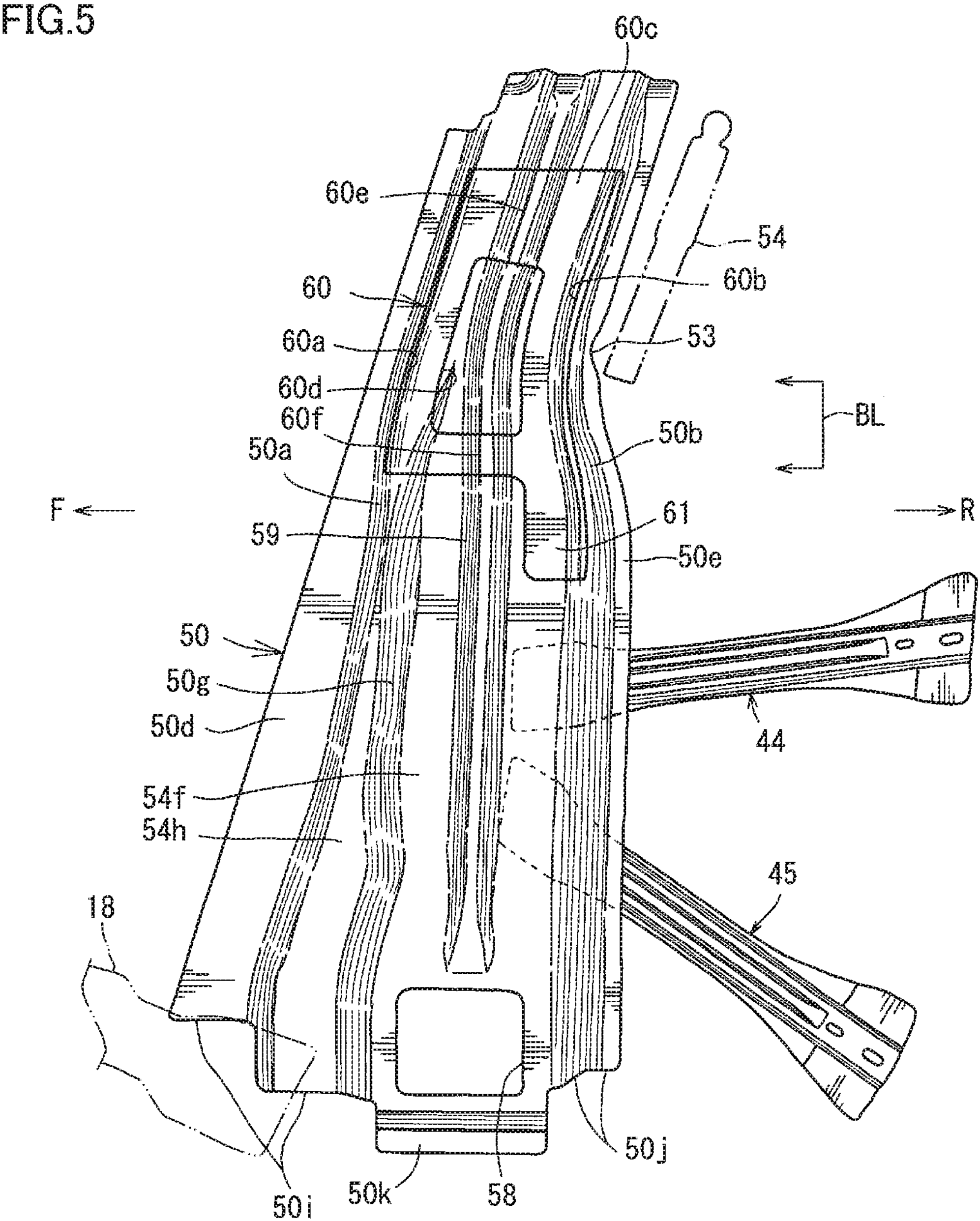
FIG. 5 is a side view of a door built-in center pillar, an upper reinforcement, and an impact beam seen from an inner side in a vehicle width direction.
Figure 6:
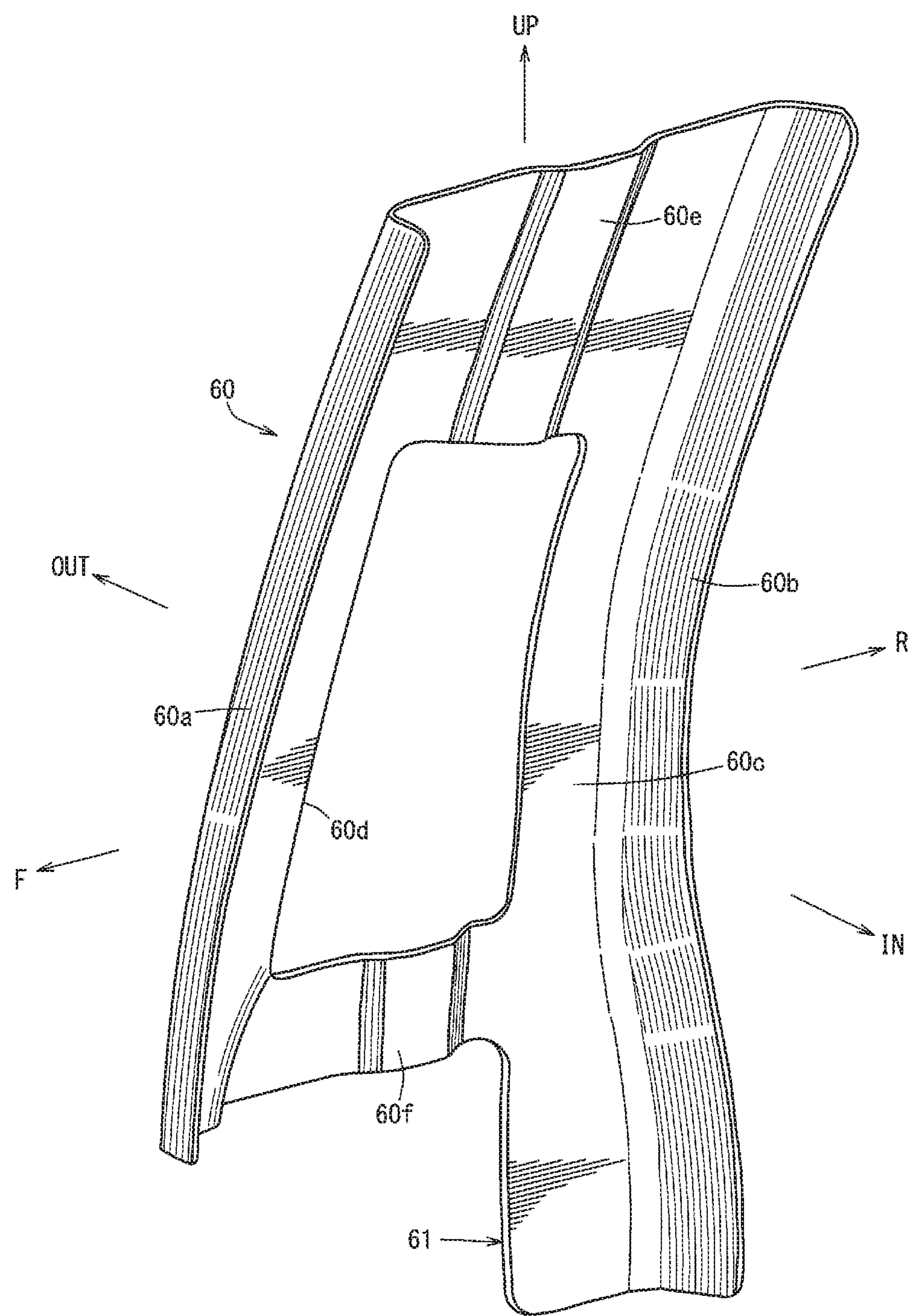
FIG. 6 is a perspective view of the upper reinforcement of FIG. 5 seen from front on the inner side in the vehicle width direction.

The drawings show a vehicle door structure. FIG. 1 is a right side view of a vehicle showing the door structure, and shows the door structure with a front door being removed. FIG. 2 is a right side view of the vehicle with a door outer panel of a rear door being removed. FIG. 3 is a right side view of the vehicle with the front door being mounted, and shows the door structure with a door outer panel of the front door being removed. FIG. 4 is a perspective view of the rear door with the door outer panel and a latch mounting plate being removed. FIG. 5 is a side view of a door built-in center pillar, an upper reinforcement, and an impact beam seen from an inner side in a vehicle width direction. FIG. 6 is a perspective view of the upper reinforcement seen from front on the inner side in the vehicle width direction.

Figure 7:
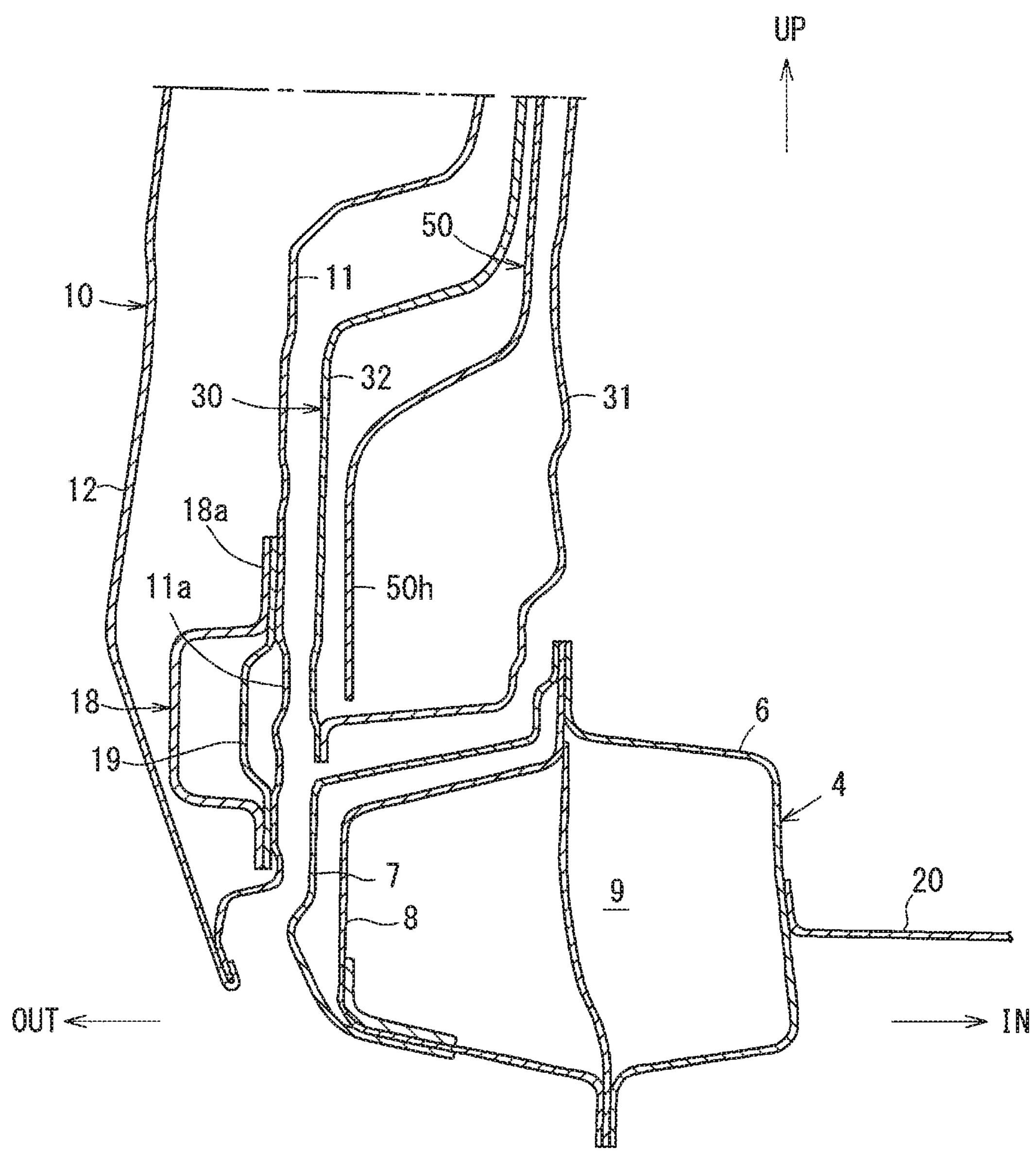
FIG. 7 is a sectional view taken in the direction of arrows A-A in FIG. 3.
Figure 8:
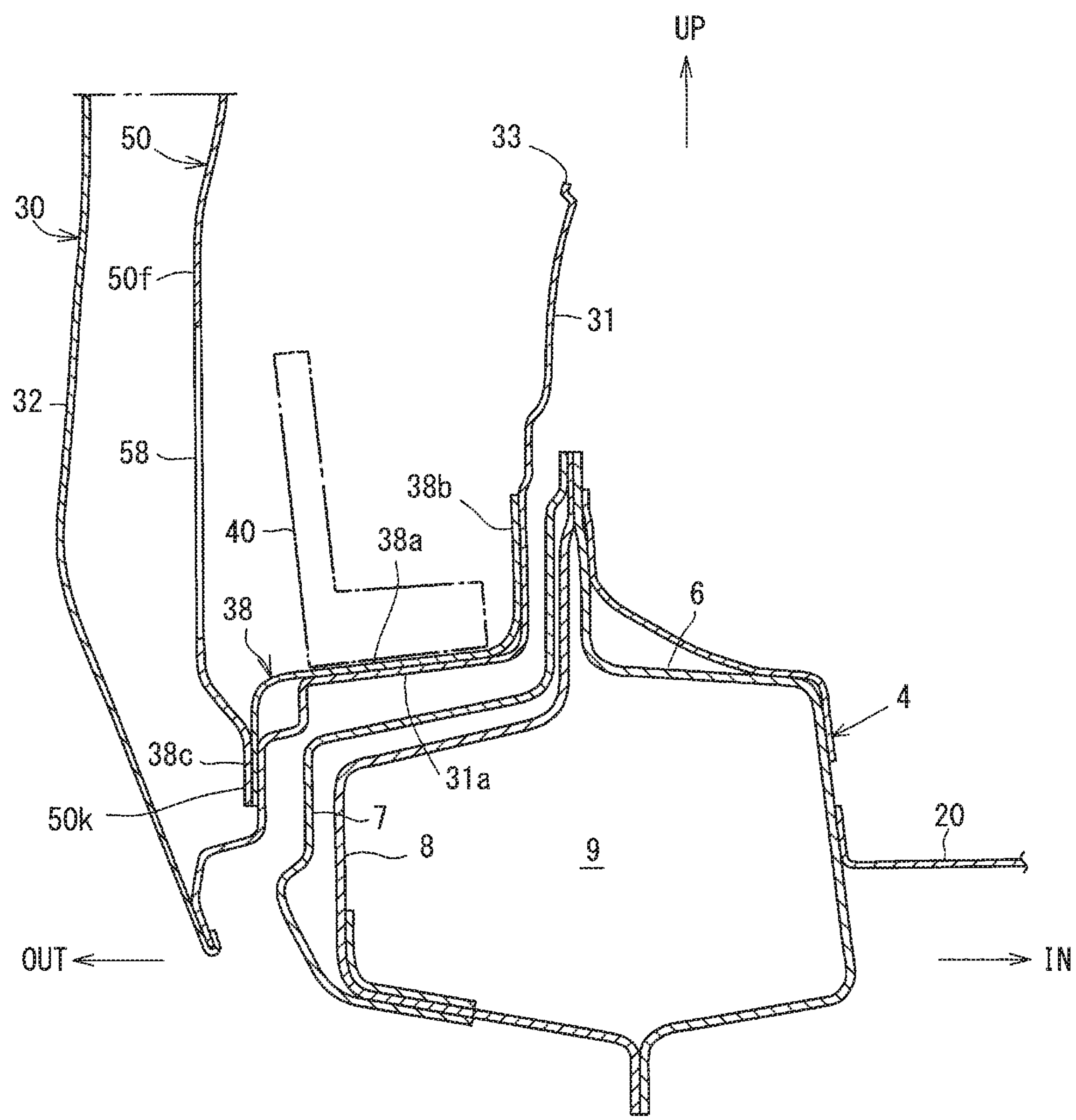
FIG. 8 is a sectional view taken in the direction of arrows B-B in FIG. 3.
Figure 9:
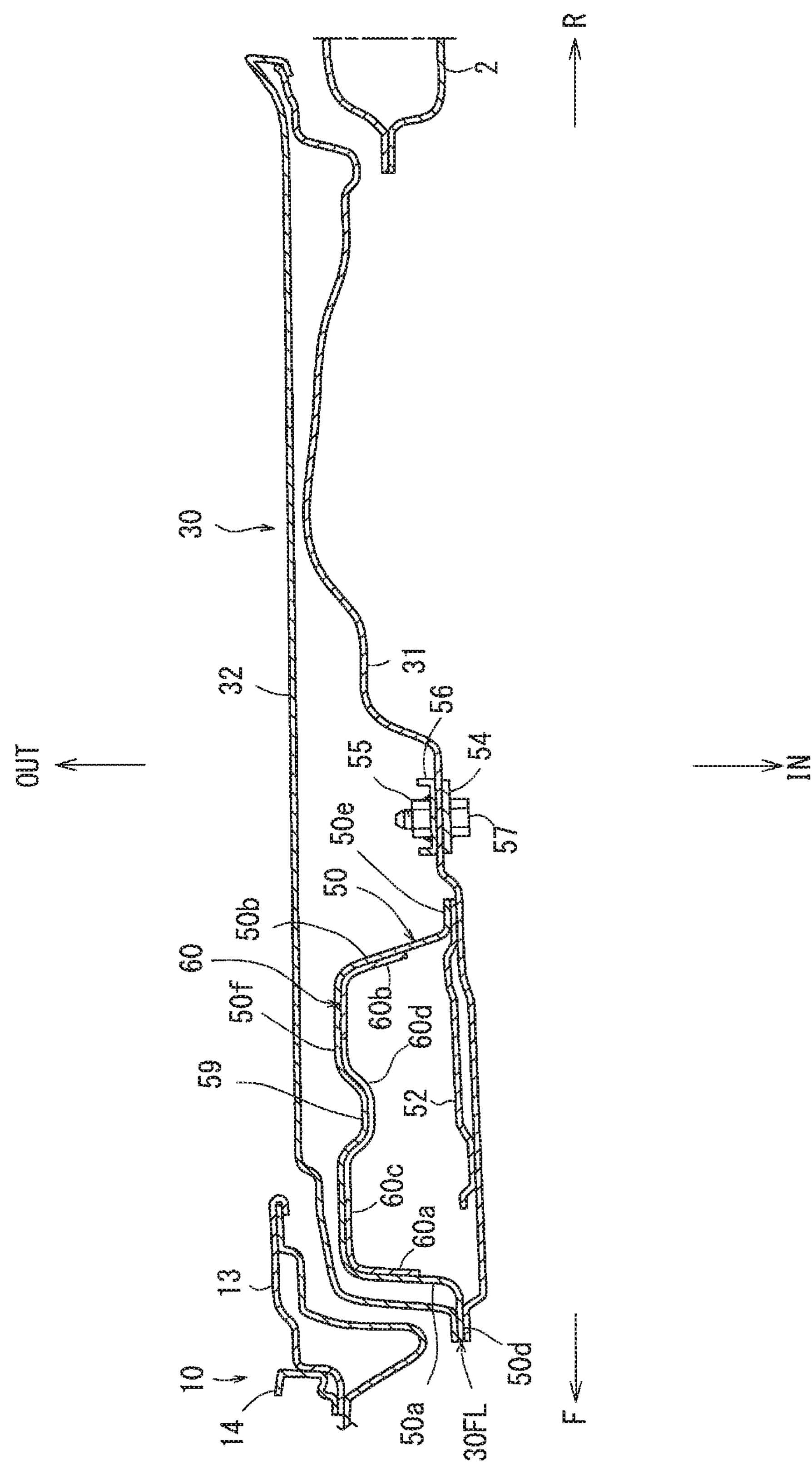
FIG. 9 is a sectional view taken in the direction of arrows C-C in FIG. 3.
Figure 10:
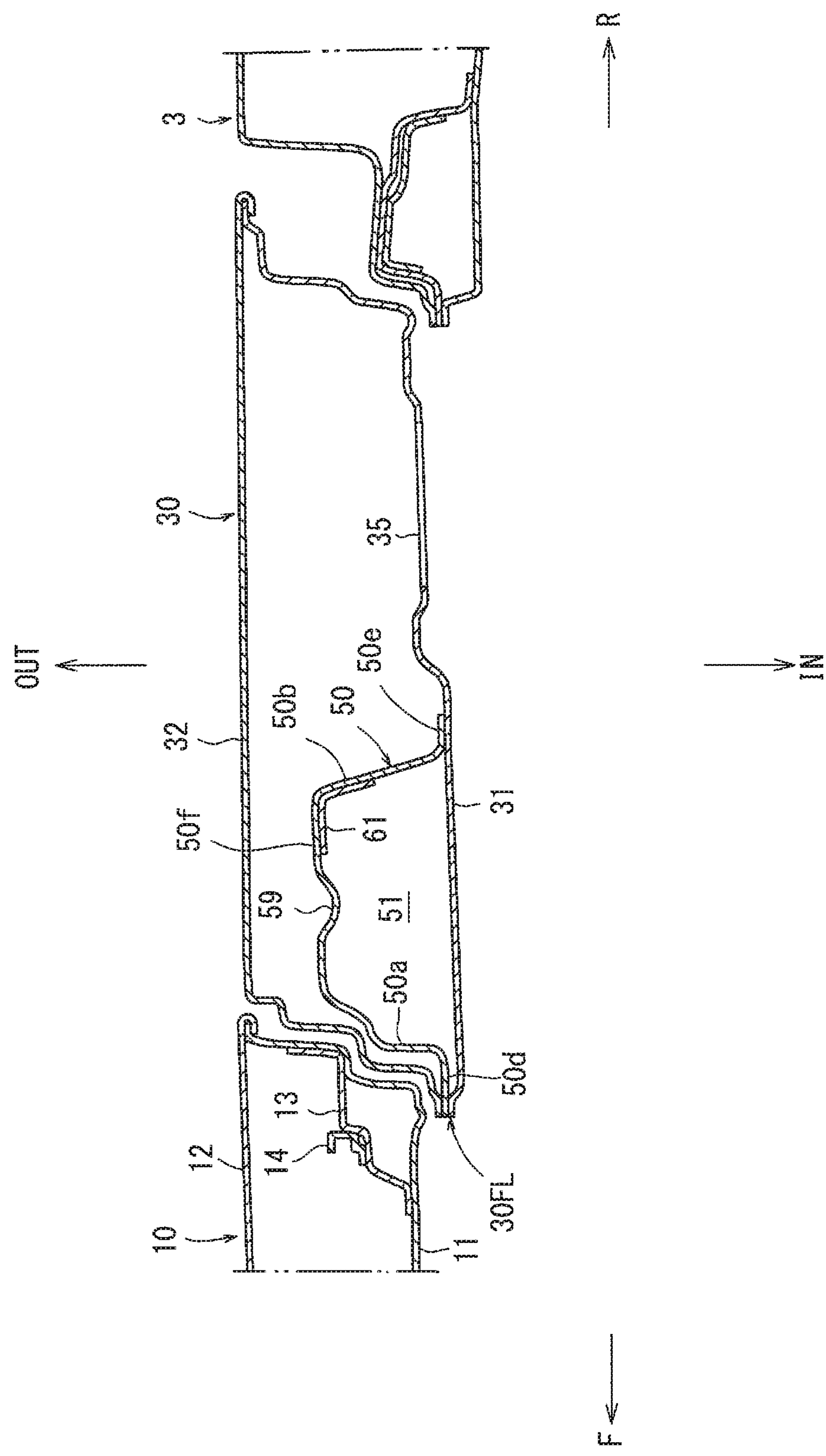
FIG. 10 is a sectional view taken in the direction of arrows D-D in FIG. 3.
Figure 11:
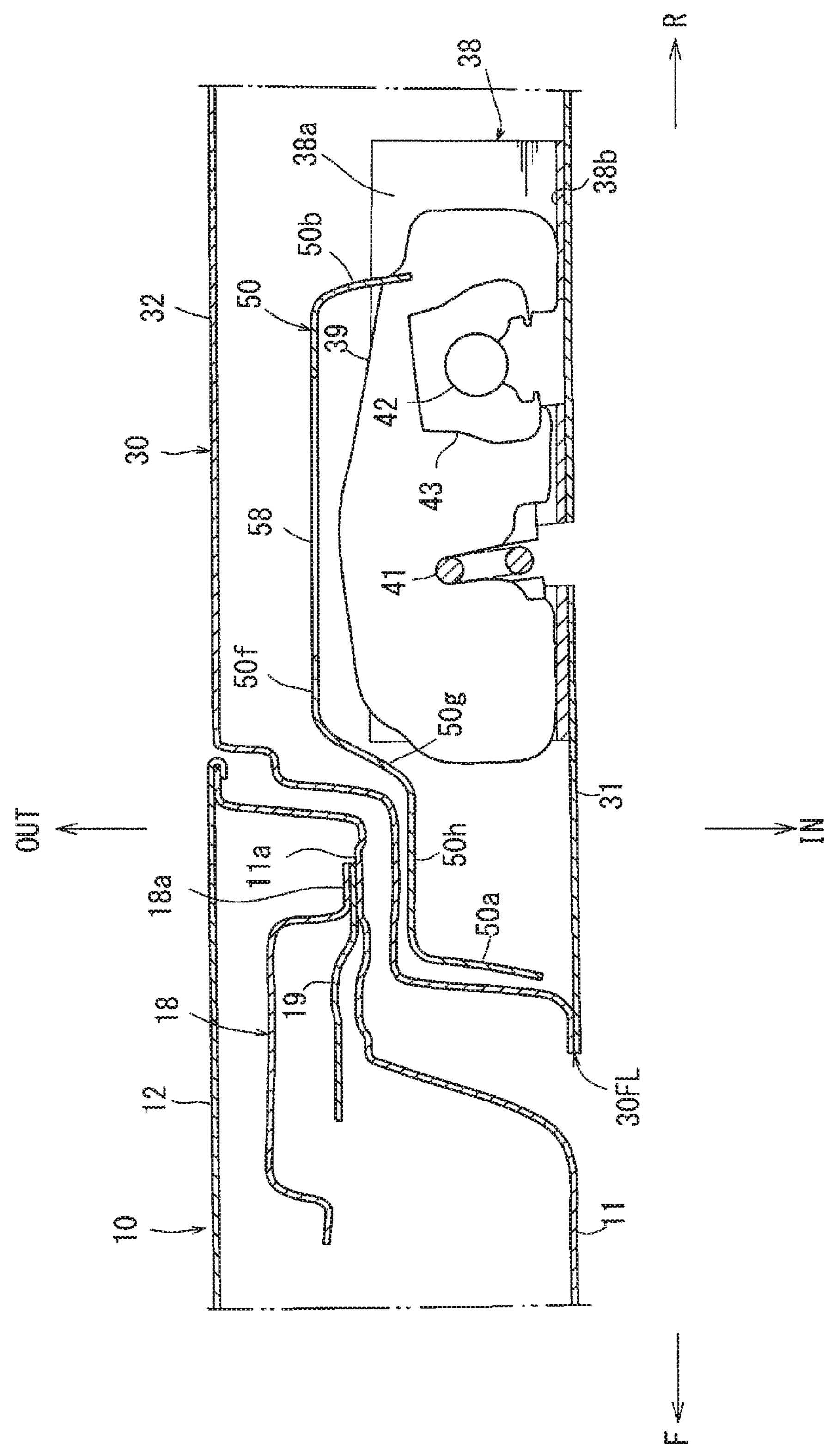
FIG. 11 is a sectional view taken in the direction of arrows E-E in FIG. 3.

FIG. 7 is a sectional view taken in the direction of arrows A-A in FIG. 3. FIG. 8 is a sectional view taken in the direction of arrows B-B in FIG. 3. FIG. 9 is a sectional view taken in the direction of arrows C-C in FIG. 3. FIG. 10 is a sectional view taken in the direction of arrows D-D in FIG. 3. FIG. 11 is a sectional view taken in the direction of arrows E-E in FIG. 3.

In the embodiments below, a configuration on a right side of the vehicle will be described. A configuration on a left side of the vehicle is symmetrical or substantially symmetrical to the configuration on the right side in the vehicle width direction.

<Basic Structure>

As shown in FIGS. 1 and 2, a door opening 5 is formed in a side part of a vehicle body. The door opening 5 is surrounded by a roof side rail 1 extending in a front-rear direction in an upper part of the vehicle body, a rear pillar 2 vertically extending in a rear part of the vehicle body, a rear body 3 extending downward continuously with the rear pillar 2, a side sill 4 extending in the front-rear direction in a lower part of the vehicle body, and a hinge pillar and a front pillar (not shown) on a front side of the vehicle, and including no center pillar.

The door opening 5 is opened and closed by a front door 10, as shown in FIG. 3 openably and closably mounted to a hinge pillar (not shown) on the front side of the vehicle via a pair of upper and lower door hinges. A rear door 30 is openably and closably mounted to the rear body 3 via a pair of upper and lower door hinges. The front door 10 and the rear door 30 constitute a biparting door system.

The biparting door system is configured so that the front door 10 is opened and closed at the door hinges on the front end, and the rear door 30 is opened and closed at the door hinges on the rear end. When both the doors 10, 30 are opened, the door opening 5 is formed without a partition between an opening of an entrance for a front seat occupant and an opening of an entrance for a rear seat occupant.

As shown in FIGS. 7 and 8, the side sill 4 is a vehicle body rigidity member that includes a side sill inner 6, a side sill outer 7, a side sill reinforcement 8, such as a side sill reinforcement, and a side sill closed section 9 extending in the front-rear direction of the vehicle. A floor panel 20 that forms a floor surface of a vehicle interior is laid between side sill inners 6, 6 of a pair of left and right side sills 4.

<Configuration of Front Door>

As shown in FIGS. 3, 7, 9, 10, and 11, the front door 10 includes a door inner panel 11 and a door outer panel 12 integrated by hemming. As shown in FIGS. 3, 9, and 10, a glass guide 14 is mounted to an upper rear part of the door inner panel 11 via a reinforcement 13.

As shown in FIG. 3, to a belt line BL of the door inner panel 11, a belt line reinforcement 15 extending along the belt line in the front-rear direction is mounted. Further, as shown in FIG. 3, a plurality of impact beams 16, 17, 18 are laid between a rear edge step-down portion 11*a* and a front step-down portion (not shown) of the door inner panel 11.

The upper impact beam 16 extends along the belt line BL in the front-rear direction of the vehicle, the vertically middle impact beam 17 extends toward a front upper side, and the lower impact beam 18 also extends toward the front upper side.

As shown in FIGS. 7 and 11, a junction plate 19 formed of plated steel sheet is provided between a rear part of the lower impact beam 18 and the rear edge step-down portion 11*a* of the door inner panel 11. The junction plate 19 prevents opening deformation of the lower impact beam 18 at the time of lateral collision of the vehicle, and prevents corrosion due to rust.

<Configuration of Rear Door>

As shown in FIGS. 7 to 11, the rear door 30 includes a door inner panel 31 and a door outer panel 32 integrated by hemming or the like. As shown in FIG. 1, a door body 30M and a door sash 30S having a smaller width in the vehicle width direction than the door body 30M are integrated by the panels 31, 32.

As shown in FIGS. 2, 3, and 4, the door inner panel 31 has a plurality of openings 33, 34, 35, 36.

Among the plurality of openings 33 to 36, the opening 33 in a front lower part is an opening through which a door latch is assembled, the opening 34 in a rear upper part is an opening into which a door window glass is fitted, and the other openings 35, 36 are provided to reduce weight.

As shown in FIGS. 1, 2, and 4, a front end line 30FL of the rear door 30 is substantially linear in a side view of the vehicle, and inclined so that an upper part is tilted rearward with a lower front side and a higher rear side. At a rear end of the door body 30M of the rear door 30, a vertically extending hinge reinforcement 37 is provided on the door inner panel 31.

As shown in FIG. 8, a latch mounting plate 38 as a reinforcement is provided on a lower surface 31*a* of the door inner panel 31 as a door lower surface. As shown in FIG. 8, the latch mounting plate 38 integrally includes a main surface 38*a* extending in the vehicle width direction, an upper piece 38*b* extending upward from an inner end of the main surface 38*a* in the vehicle width direction, and a lower piece 38*c* extending downward from an outer end of the main surface 38*a* in the vehicle width direction.

To the latch mounting plate 38, a latch unit 40 as shown in FIG. 8, is mounted via a base plate 39 in FIG. 11. In FIG. 11, reference numeral 41 denotes a striker, 42; a pin, and 43; a pin receiver.

<Door Built-In Center Pillar and Configuration Therearound>

As shown in FIGS. 2 and 3, a door built-in center pillar 50, hereinafter referred to as center pillar 50, is provided at a front end in the rear door 30, the center pillar 50 being formed of ultra-high tensile strength steel sheet and vertically extending from an upper end to a lower end of the rear door 30. Particularly, as shown in FIG. 8, the lower end of the center pillar 50 is fixedly joined to the lower part of the door inner panel 31 via the latch mounting plate 38. As shown in FIGS. 2 and 4, a front end of the center pillar 50 is inclined along the rearward tilt of the front end line 30FL of the rear door 30.

As shown in FIGS. 9 and 10, in this embodiment, the center pillar 50 is disposed in a front position in the rear door 30 so that the front end of the center pillar 50 substantially matches the front end of the door inner panel 31.

As shown in FIGS. 9 to 11, the center pillar 50 includes a front surface 50*a* extending in the vehicle width direction, a rear surface 50*b* extending in the vehicle width direction, and a base side surface 50*f* extending in the front-rear direction of the vehicle and coupling outer ends of the front and rear surfaces, has a hat-shaped section in a plan view which opens on the inner side in the vehicle width direction, the hat-shaped section integrally including a flange 50*d* extending forward of the vehicle from an inner end of the front surface 50*a* in the vehicle width direction, and integrally including a flange 50*e* extending rearward of the vehicle from an inner end of the rear surface 50*b* in the vehicle width direction. The flanges 50*d*, 50*e* are formed to extend in the front-rear direction of the vehicle, as shown in FIGS. 9 and 10.

A second side surface 50*h* described later and a middle front surface 50*g*, as shown in FIG. 11, are provided between an outer end of the front surface 50*a* and a front end of the base side surface 50*f*. The middle front surface 50*g* extends substantially in the vehicle width direction, and the second side surface 50*h* extends in the front-rear direction of the vehicle. A detailed structure of the second side surface 50*h* will be described later.

As shown in FIG. 10, the front and rear flanges 50*d*, 50*e* are joined to the door inner panel 31, and a vertically extending closed section 51 is formed between the center pillar 50 and the door inner panel 31.

As shown in FIG. 9 that is a sectional view taken in the direction of arrows C-C in FIG. 3, a reinforcement 52 is provided between the door inner panel 31 on the door sash 30S and the rear flange 50*e* of the center pillar 50.

As shown in FIGS. 2, 3, and 5, a plurality of impact beams 44, 45 connecting the hinge reinforcement 37 located at the rear end of the door and a rear part of the base side surface 50*f* of the center pillar 50 are provided below the belt line BL in the rear door 30.

Out of the plurality of impact beams, the upper impact beam 44 extends toward a front lower side from an upper position of the hinge reinforcement 37 to the base side surface 50*f* of the center pillar 50, and the lower impact beam 45 extends toward a front upper side from a lower end of the hinge reinforcement 37 to the base side surface 50*f* of the center pillar 50. The upper and lower impact beams 44, 45 are disposed in different positions and inclined in different directions so as to receive a lateral collision load over a broad range of the door body 30M of the rear door 30.

As shown in FIGS. 2 and 5, one of the front part and the rear part (rear part in this embodiment) of the center pillar 50 is bent at the belt line BL to form a bend 53, a front-rear width of the center pillar 50 above the bend 53 is smaller than that of the center pillar 50 below the bend 53, and an anchor adjustor 54 of a seat belt is provided adjacent to a region above the bend 53 of the center pillar 50.

As shown in FIG. 9, the anchor adjustor 54 is provided on a surface of the door inner panel 31 on a vehicle interior side, being the inner side in the vehicle width direction. As shown in FIG. 9, a pair of upper and lower brackets 56, to which a nut 55 is previously fixedly welded, is welded to a surface of the door inner panel 31 on a side of a door internal space, being the outer side in the vehicle width direction, and a bolt 57 fastened to the nut 55, being a weld nut, from inside the vehicle interior is used to mount the anchor adjustor 54 to the door inner panel 31.

As shown in FIGS. 9 and 10, the rear end, that is, the rear flange 50*e*, of the center pillar 50 is fixedly joined only to the door inner panel 31, while the front end, that is, the front flange 50*d*, of the center pillar 50 is fixedly joined to the door outer panel 32 and the door inner panel 31 over the substantially entire vertical length from the upper part to the lower part to achieve three-piece welding of the elements 31, 32, 50. The bend 53 is formed on the rear side of the center pillar 50, and the anchor adjustor 54 is disposed adjacent to the rear side of the center pillar 50.

As shown in FIG. 11, a rear end of the lower impact beam 18 provided in the front door 10 overlaps the center pillar 50 at the second side surface 50*h*, in the rear door 30 in the side view of the vehicle.

As shown in FIGS. 3 and 5, the center pillar 50 has an increasing front-rear width toward the lower side.

As shown in FIG. 11, the center pillar 50 includes the base side surface 50*f* located on the outer side of a rear inner end 18*a* of the impact beam 18 in the vehicle width direction, and the second side surface 50*h* located on the inner side of the rear inner end 18*a* of the impact beam 18 in the vehicle width direction. The second side surface 50*h* is formed on the front side of the lower part of the center pillar 50, and as shown in FIG. 11, the rear end of the impact beam 18 overlaps the second side surface 50*h* in the side view of the vehicle.

As such, the base side surface 50*f* of the center pillar 50 is located on the outer side of the rear inner end 18*a* of the impact beam 18 in the vehicle width direction to ensure a large width of the center pillar 50 in a basic section in the vehicle width direction, as shown, for example, by the width between the door inner panel 31 and the base side surface 50*f* in the vehicle width direction in FIGS. 9, 10, and 11. Further, the rear end of the impact beam 18 overlaps the second side surface 50*h* so as to receive a load from the impact beam 18 in the front door 10 at the time of lateral collision.

As shown in FIGS. 2, 4, and 5, the second side surface 50*h* has a decreasing front-rear width toward the upper side, thereby ensuring a load receiving surface by the second side surface 50*h* and avoiding stress concentration due to a sudden change in rigidity.

As shown in FIGS. 2 and 5, the base side surface 50*f* has a substantially constant front-rear width below the belt line BL, and the second side surface 50*h* has a vertically long triangular shape with the lower part of the belt line BL being the vertex in the side view of the vehicle. This ensures a constant front-rear width of the base side surface 50*f* below the belt line BL and ensures an area of the second side surface 50*h*.

As shown in FIGS. 2 and 7, the rear end of the impact beam 18 in the front door 10 is arranged to overlap the lower end of the center pillar 50 in the side view of the vehicle at a lowermost end of the second side surface 50*h* and the side sill 4. Thus, the lateral collision load from the rear end of the impact beam 18 is distributed and transferred to the center pillar 50 and the side sill 4.

As shown in FIG. 7, an outer side of the second side surface 50*h* of the center pillar 50 and an outer side of the side sill reinforcement 8 that reinforces the side sill 4 are located substantially in the same position in the vehicle width direction. Thus, the lateral collision load from the rear end of the impact beam 18 can be applied to the second side surface 50*h* of the center pillar 50 and the side sill reinforcement 8 at the same timing at the time of lateral collision, thereby distributing the load.

<Upper Reinforcement and Structure Therearound>

As shown in FIGS. 5 and 6, an upper reinforcement 60, or backing member, that integrally reinforces the surfaces of the center pillar 50, for example, as shown by the front surface 50*a*, the rear surface 50*b*, and the base side surface 50*f* in FIG. 9, is provided from the upper end of the center pillar 50 to the belt line BL. Thus, the upper reinforcement 60 reinforces the door sash 30S covering the upper end of the center pillar 50 and the belt line BL. The reinforcement with the upper reinforcement 60 prevents a reduction in rigidity due to the door sash 30S having a smaller thickness in the vehicle width direction than the door body 30M, thereby eliminating a difference in rigidity between the upper and lower parts of the rear door 30.

As shown in FIG. 5, the upper reinforcement 60 is abutted against an inner surface of the center pillar 50 in the vehicle width direction. The upper reinforcement 60 includes, correspondingly to the shape of the center pillar 50 against which the upper reinforcement 60 is abutted, a front surface 60*a* extending in the vehicle width direction, a rear surface 60*b* extending in the vehicle width direction, and a side surface 60*c* extending in the front-rear direction of the vehicle and coupling outer ends of the front and rear surfaces. The upper reinforcement 60 also includes an opening 60*d* in a middle part of the side surface 60*c*, specifically, a middle part in vertical and front-rear directions. Also, corresponding to a reinforcing bead 59 of the center pillar 50 described later, vertically extending beads 60*e*, 60*f* are integrally formed with the side surface 60*c* above and below the opening 60*d*.

In this embodiment, the upper reinforcement 60 is fixedly joined to the inner surface of the center pillar 50 in the vehicle width direction. However, the upper reinforcement 60 may be fixedly joined to an outer surface of the center pillar 50 in the vehicle width direction.

As shown in FIGS. 5 and 6, the upper reinforcement 60 includes a downward extending portion 61 extending from a part of the upper reinforcement 60 partially to below the belt line BL. The downward extending portion 61 reduces a difference in rigidity between parts of the center pillar 50 above and below the belt line BL which may be caused by the upper reinforcement 60.

As shown in FIGS. 5 and 10, the downward extending portion 61 has a substantially L-shaped section in a horizontal direction and extends downward from a region covering the rear part of the base side surface 50*f* and the rear surface 50*b* of the center pillar 50 on the side to which the impact beams 44, 45 are connected. Thus, the rear part of the center pillar 50 to which a larger lateral collision load is applied can be further reinforced by the impact beams 44, 45.

In this embodiment, as shown in FIG. 5, the downward extending portion 61 of the upper reinforcement 60 has the substantially L-shaped section in the horizontal direction and extends downward from the region covering the base side surface 50*f* and the rear surface 50*b* on the side formed with the bend 53. The upper reinforcement 60 reinforces the upper part of the center pillar 50 above the bend 53, which has the small front-rear width, and the downward extending portion 61 is provided on the side formed with the bend 53 to also reinforce the bend 53.

<Configuration of Center Pillar Lower Part>

As shown in FIG. 8, in the lower part of the center pillar 50, the latch mounting plate 38 as the reinforcement is mounted on the lower surface 31*a* of the door inner panel 31 as the door lower surface. An opening 58 as a low rigidity portion having lower rigidity than an upper part of the center pillar 50 is provided in the base side surface 50*f* directly above the lower end of the center pillar 50.

As such, the latch mounting plate 38 as the reinforcement is provided on the door lower surface below the center pillar 50. Such a configuration can displace inward a region directly above the lower end of the center pillar 50 through the opening 58 as the low rigidity portion while preventing displacement of the door lower surface to absorb lateral collision energy immediately after lateral collision.

The low rigidity portion comprises the opening 58, and thus the opening 58 reduces rigidity near the lower end of the center pillar 50 and also reduces weight.

As shown in FIG. 8, the latch unit 40 is provided via the latch mounting plate 38 on the lower surface 31*a* of the door inner panel 31 as the door lower surface inside the center pillar 50. The reinforcement comprises the latch mounting plate 38, and the opening 58 is sized so that the latch unit 40 partially inserted through the opening 58 can be changed in orientation when the latch unit 40 is assembled.

The latch unit 40 is inserted through the opening 33 in FIGS. 2 and 3 into a space between the door inner panel 31 and the center pillar 50 and assembled to the latch mounting plate 38. The orientation of the latch unit 40 needs to be changed in the space in assembly, and at that time, the latch unit 40 may interfere with the door inner panel 31 or the center pillar 50. However, the opening 58 is sized so that the latch unit 40 partially inserted through the opening 58 can be changed in orientation, and thus can be used to ensure efficient assembly of the door latch. Also, the latch mounting plate 38 can be effectively used as the reinforcement, thereby eliminating the need to separately provide a reinforcing member.

<Configuration of Reinforcing Bead>

As shown in FIGS. 2 and 4, on the middle part of the base side surface 50*f* of the center pillar 50 in the front-rear direction, the reinforcing bead 59 is integrally formed, which vertically extends from a position directly above the opening 58 to the upper end of the center pillar and is recessed inward in the vehicle width direction.

The reinforcing bead 59 is formed to increase rigidity of the center pillar 50, prevent undesirable displacement of the upper part of the center pillar 50 along with displacement of the opening 58, and further prevent falling displacement of the center pillar 50 to ensure stable crushing displacement when the center pillar 50 is crushed.

Figure 12:
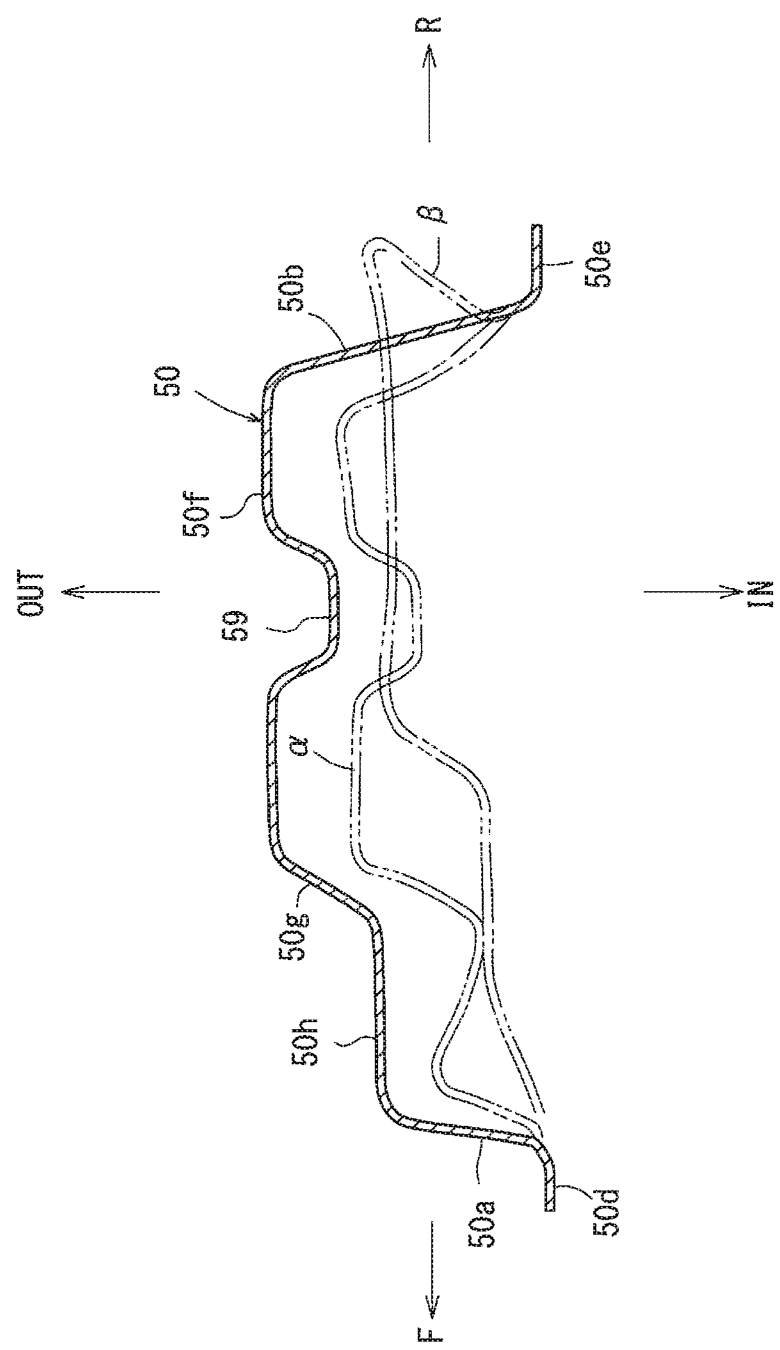
FIG. 12 illustrates a crushed state of a door built-in center pillar according to an embodiment of the present application.

FIG. 12 illustrates a crushed state of the center pillar 50. Without the reinforcing bead 59, the center pillar is subjected to falling displacement as shown by a virtual line $\beta$ in FIG. 12 when the lateral collision load is applied. With the vertically extending reinforcing bead 59 formed on the base side surface 50*f*, rigidity and resistance to lateral collision of the base side surface 50*f* are increased. Thus, the center pillar 50 is subjected to stable crushing displacement as shown by a virtual line $\alpha$ in FIG. 12 when the lateral collision load is applied, thereby increasing shock absorbing energy as compared to a structure without the reinforcing bead 59.

<Configuration of Center Pillar Lower Part>

As shown in FIGS. 2 and 5, non-flange portions 50*i*, 50*j* as low rigidity portions are formed in front and rear parts of the lower end of the center pillar 50. As shown in FIG. 8, only a lowermost end 50*k* of the base side surface 50*f* directly below the opening 58 is joined to the lower end of the door inner panel 31.

As shown in FIG. 8, the lowermost end 50*k* of the base side surface 50*f* is joined to the lower end of the door inner panel 31 via the lower piece 38*c* of the latch mounting plate 38 as the reinforcement, for example, by three-piece welding, thereby ensuring rigidity of the lowermost end 50*k* of the base side surface 50*f*.

As described above, the non-flange portions 50*i*, 50*j* are provided in the front and rear parts of the lower end of the center pillar 50, and thus reduce rigidity near the lower end of the center pillar 50 and also reduce weight.

As shown in FIGS. 4 and 5, the second side surface 50*h* retracted from the base side surface 50*f* into the vehicle interior is formed in the front part of the lower part or the lower end of the center pillar 50. The rear end of the impact beam 18 provided in the front door 10 as shown by the virtual line in FIG. 2 overlaps the second side surface 50*h* in the side view of the vehicle, and the non-flange portion 50*i* is formed at the overlapping region.

Thus, the load from the impact beam 18 can be received by the second side surface 50*h* at the time of lateral collision, and the low rigidity portion is constituted by the non-flange portion 50*i*, thereby allowing the front part of the lower end of the center pillar 50 to be displaced inward of the door at the time of lateral collision.

In FIGS. 1 to 3, reference numeral 21 denotes a rear wheel house. In the drawings, an arrow F indicates the front side of the vehicle, an arrow R indicates the rear side of the vehicle, an arrow IN indicates the inner side in the vehicle width direction, an arrow OUT indicates the outer side in the vehicle width direction, and an arrow UP indicates the upper side of the vehicle.

As such, the embodiment provides the vehicle door structure including the center pillar 50 extending from the upper end to the lower end at the front end in the rear door 30 of the biparting door system, wherein the reinforcement, for example, the latch mounting plate 38, is provided on the door lower surface below the center pillar 50, the part, being the lowermost end 50*k* of the lower end of the center pillar 50 is mounted to the latch mounting plate 38, and the low rigidity portions (see the non-flange portions 50*i*, 50*j* and the opening 58) having lower rigidity than the upper part of the center pillar 50 are provided directly above the lower end of the center pillar 50, as shown in FIGS. 2 and 8.

According to this configuration, the reinforcement or latch mounting plate 38 is provided on the door lower surface below the center pillar 50. Thus, the configuration can displace inward the region directly above the lower end of the center pillar 50 through the low rigidity portion while preventing displacement of the door lower surface to absorb lateral collision energy immediately after lateral collision.

In an embodiment of the present application, the center pillar 50 includes the front surface 50*a*, the rear surface 50*b*, and the side surface, such as the base side surface 50*f*, coupling the outer ends of the front and rear surfaces, and the low rigidity portion is constituted by the opening 58 formed in the base side surface 50*f* as shown in FIGS. 5, 9, and 10.

According to this configuration, the opening 58 formed in the base side surface 50*f* of the center pillar 50 can reduce rigidity near the lower end of the center pillar 50 and also reduce weight.

Further, in an embodiment of the present application, the door latch or the latch unit 40 is provided via the reinforcement, or the latch mounting plate 38, on the door lower surface inside the center pillar 50, and the opening 58 is sized so that the latch unit 40 partially inserted through the opening 58 can be changed in orientation when the latch unit 40 is assembled as shown in FIGS. 8 and 11.

According to this configuration, the opening 58 can be used to ensure efficient assembly of the latch unit 40, and the latch mounting plate 38 can be effectively used as the reinforcement.

Further, in an embodiment of the present application, the reinforcing bead 59 extending from a position directly above the opening 58 to the upper end is formed on the base side surface 50*f* of the center pillar 50, as shown in FIGS. 2 and 5.

According to this configuration, the reinforcing bead 59 can be formed to increase rigidity of the center pillar 50, thus prevent displacement of the upper part of the center pillar 50 along with displacement of the opening 58, and further prevent falling displacement, as shown by the virtual line β in FIG. 12, of the center pillar 50 to ensure stable crushing displacement, as shown by the virtual line α in FIG. 12, when the center pillar 50 is crushed.

Further, in an embodiment of the present application, the center pillar 50 has the hat-shaped section in the plan view which opens on the inner side, and the hat-shaped section includes the flanges 50*d*, 50*e* integrally formed with the front surface 50*a* and the rear surface 50*b* to extend in the front-rear direction of the vehicle. The flanges 50*d*, 50*e* are joined to the door inner panel 31, the non-flange portions 50*i*, 50*j* as the low rigidity portions are provided at the lower end of the center pillar 50, and only the base side surface 50*f* is joined to the lower end of the door inner panel 31, as shown in FIGS. 2, 8, 9, and 10.

According to this configuration, the non-flange portions 50*i*, 50*j* are provided at the lower end of the center pillar 50, and thus can reduce rigidity near the lower end of the center pillar 50 and also reduce weight.

Further, in an embodiment of the present application, the second side surface 50*h* retracted from the base side surface 50*f* into the vehicle interior is formed in the front part of the lower end of the center pillar 50, the rear end of the impact beam 18 provided in the front door 10 overlaps the second side surface 50*h* in the side view of the vehicle, and the non-flange portion 50*i* is formed at the overlapping region, as shown in FIGS. 2 and 11.

According to this configuration, the load from the impact beam 18 can be reliably received by the second side surface 50*h* at the time of lateral collision, and the low rigidity portion is constituted by the non-flange portion 50*i*, thereby allowing the lower end of the center pillar 50 to be displaced inward at the time of lateral collision.

In various configurations of the present application and the above described embodiment, the reinforcement in the present application may correspond to the latch mounting plate 38 in the embodiment, and similarly, the door built-in center pillar may correspond to the center pillar 50, the low rigidity portion may correspond to the opening 58 and the non-flange portions 50*i*, 50*j*, the side surface may correspond to the base side surface 50*f*, and the door latch may correspond to the latch unit 40. However, the present application is not limited to the configuration of the above described embodiments.

As described above, the present application is applicable to a vehicle door structure including a door built-in center pillar extending from an upper end to a lower end at a front end in a rear door of a biparting door system.

What is claimed is:

1. A vehicle door structure comprising:

a side door that is openably and closably supported by a vehicle body via a door hinge provided at a rear part of the side door, the side door including, a door side engaging portion that is provided in a lower part of the side door and configured to engage a vehicle body side engaging portion provided in a vehicle body lower part at the time of lateral collision;

a door built-in center pillar extending from an upper end to a lower end in a front part in the side door; and a reinforcement mounted to a door lower part below the door built-in center pillar, wherein a part of the lower end of the door built-in center pillar is mounted to the reinforcement, a low rigidity portion having lower rigidity than an upper part of the door built-in center pillar is provided directly above the lower end of the door built-in center pillar, the door built-in center pillar includes a front surface, a rear surface, and a side surface coupling outer ends of the front and rear surfaces, the low rigidity portion is constituted by an opening formed in the side surface, the door built-in center pillar has a hat-shaped section in a plan view which opens on an inner side in a vehicle width direction, the hat-shaped section including flanges integrally formed with the front surface and the rear surface to extend in a front-rear direction of a vehicle, the door built-in center pillar is joined to a door inner panel via the flanges, the low rigidity portion comprises a non-flange portion provided at the lower end of the door built-in center pillar, and the door built-in center pillar is joined to a lower end of the door inner panel only on the side surface of the door built-in center pillar.

2. The vehicle door structure according to claim 1, wherein the door side engaging portion comprises a door latch that is provided via a latch mounting plate on a door lower surface inside the door built-in center pillar, the reinforcement comprises the latch mounting plate, and the opening is configured to allow the door latch partially inserted through the opening to be changed in orientation when the door latch is assembled.

3. The vehicle door structure according to claim 1, wherein a reinforcing bead extending from a position directly above the opening to an upper end of the door built-in center pillar is formed on the side surface of the door built-in center pillar.

4. The vehicle door structure according to claim 1, wherein a second side surface retracted from the side surface into a vehicle interior is formed in a front part of the lower end of the door built-in center pillar, a rear end of an impact beam provided in a front door overlaps the second side surface in a side view of the vehicle, and the non-flange portion is formed at the overlapping region.

5. A vehicle door structure comprising:

a side door that is openably and closably supported by a vehicle body via a door hinge provided at a rear part of the side door, the side door including:

a door inner panel;

a door outer panel;

a door side engaging portion that is provided in a lower part of the side door and configured to engage a vehicle body side engaging portion provided in a vehicle body lower part at the time of lateral collision;

a door built-in center pillar extending from an upper end to a lower end in a front part in the side door and fixedly joined to the door inner panel; and a reinforcement mounted to a door lower part below the door built-in center pillar, wherein a part of the lower end of the door built-in center pillar is mounted to the reinforcement, and the door built-in center pillar includes a low rigidity portion having lower rigidity than an upper part of the door built-in center pillar, the low rigidity portion being provided directly above the lower end of the door built-in center pillar and between the door inner panel and the door outer panel.

6. The vehicle door structure according to claim 5, wherein the door built-in center pillar includes a front surface, a rear surface, and a side surface coupling outer ends of the front and rear surfaces, and the low rigidity portion is constituted by an opening formed in the side surface.

* * * * *